(No Model.)

W. T. BOOTH & A. H. BELL.
SEPARATOR FOR STARCH.

No. 256,630.  Patented Apr. 18, 1882.

WITNESSES:
Francis McArdle
C. Sedgwick

INVENTOR:
A. H. Bell
W. T. Booth
BY Munn & Co
ATTORNEYS.

UNITED STATES PATENT OFFICE.

WILLIAM T. BOOTH AND ALEXANDER H. BELL, OF NEW YORK, N. Y.; SAID BELL ASSIGNOR TO SAID BOOTH.

SEPARATOR FOR STARCH.

SPECIFICATION forming part of Letters Patent No. 256,630, dated April 18, 1882.

Application filed October 8, 1881. (No model.)

*To all whom it may concern:*

Be it known that we, WILLIAM T. BOOTH and ALEXANDER H. BELL, of the city, county, and State of New York, have invented a new and useful Improvement in Separators for Starch, of which the following is a full, clear, and exact specification.

Our improvements relate to apparatus used in the manufacture of starch for separating the starch from the other portions of the ground corn. The ground materials being moist, it has been found difficult to separate the starch properly by a screen, and the object of our invention is to obviate that difficulty.

Our invention consists in a screen vibrated positively by a cam, as hereinafter described and claimed.

Reference is to be had to the accompanying drawings, forming part of this specification, in which similar letters of reference indicate corresponding parts in all the figures.

Figure 1:
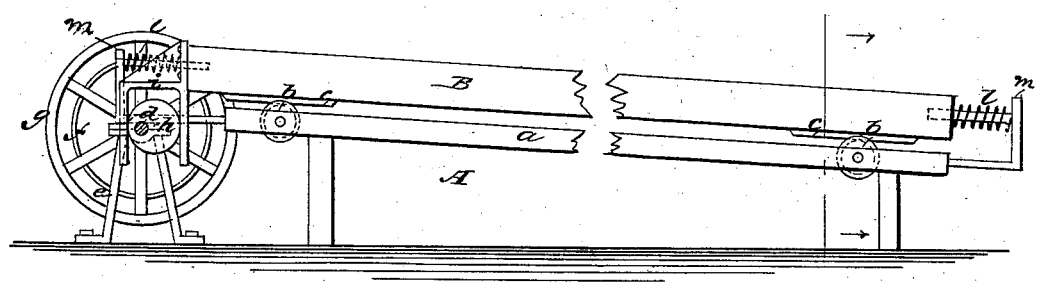
Figure 2:
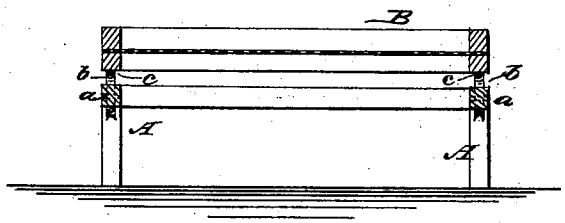

Figure 1 is a side elevation of our improved screen, and Fig. 2 is a cross-section of the same.

A is the supporting-frame, having side rails, *a*, on which grooved friction-rollers *b b* are sustained in suitable bearings.

B is the screen or sieve, fitted with guide-irons *c c*, that slide upon the rollers *b*, so that the sieve is supported and guided in its movement. The frame is inclined so that the screen has an inclination to insure forward movement of the materials.

At the upper end of frame A is a shaft, *d*, supported on suitable stands, *e*, and provided with a pulley, *f*, for connection of power to revolve the shaft, a balance-wheel, *g*, and an eccentric, *h*. On the screen frame or box is fixed a yoke, *i*, having arms that extend over the eccentric *h*, and at the upper and lower ends of the screen are spiral springs *l l*, held between the screen-frame and fixed guides *m*, attached to each end of the frame, so as to exert pressure endwise of the screen and cause the arms of the yoke at all times to be in contact with the eccentric to impart a smooth reciprocating motion to the said screen.

In operation, the shaft *d* being revolved, the eccentric acts to give a reciprocating movement to the screen. The ground material fed to the upper end of the screen is agitated and moved forward by the motion, and the fine particles of starch are shaken through the meshes of the screen, so that only the refuse passes off at the lower end.

We are aware that it is not broadly new to impart a reciprocating motion to a screen by means of an eccentric, and we therefore do not claim such; but What we do claim, and desire to secure by Letters Patent, is—

1. In a starch-separator, the combination, with supports provided with rollers, of the shaking sieve-frame having guide-bars sliding on said rollers, substantially as set forth.

2. In a starch-separator, the combination, with the frame A, the drive-shaft *d*, the eccentric *h*, and the screen B, provided with yoke *i* at its upper end, of the springs *l*, interposed between the said screen and fixed guides at each end of the screen, substantially as and for the purpose set forth.

3. In a starch-separator, the combination, with the frame A, provided with the grooved rollers *b*, the shaft *d*, the eccentric *h*, and the guides *m*, of the screen B, provided with guide-irons *c* and the yoke *i*, and the springs *l*, interposed between the screen and said fixed guides, substantially as and for the purpose set forth.

WILLIAM T. BOOTH.
ALEX. H. BELL.

Witnesses:
BENJ. HILTON,
HENRY A. KEELER.